United States Patent
Bauer et al.

(10) Patent No.: US 7,815,792 B2
(45) Date of Patent: Oct. 19, 2010

(54) SELECTIVE NAPHTHA DESULFURIZATION PROCESS AND CATALYST

(75) Inventors: Lorenz J. Bauer, Schaumburg, IL (US); Suheil F. Abdo, Lincolnshire, IL (US); Laura E. Leonard, Western Springs, IL (US); Peter Kokayeff, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/605,730

(22) Filed: Oct. 26, 2009

(65) Prior Publication Data

US 2010/0044275 A1   Feb. 25, 2010

Related U.S. Application Data

(62) Division of application No. 10/875,117, filed on Jun. 23, 2004, now Pat. No. 7,629,289.

(51) Int. Cl.
| | |
|---|---|
| C10G 25/00 | (2006.01) |
| C10G 29/00 | (2006.01) |
| C10G 45/00 | (2006.01) |
| C10G 51/00 | (2006.01) |
| C10G 55/00 | (2006.01) |
| C10G 57/00 | (2006.01) |
| B01J 23/00 | (2006.01) |
| B01J 29/00 | (2006.01) |
| B01J 21/00 | (2006.01) |
| B01J 20/00 | (2006.01) |

(52) U.S. Cl. ............... 208/243; 208/67; 208/213; 208/217; 208/244; 502/66; 502/74; 502/255; 502/260; 502/263; 502/313; 502/314; 502/321; 502/322; 502/323; 502/327; 502/332; 502/350; 502/351; 502/415; 502/439

(58) Field of Classification Search .......... 208/67, 208/213, 217, 216 R, 243, 244; 502/66, 502/74, 255, 260, 263, 313, 314, 321, 322, 502/323, 327, 332, 350, 351, 415, 439
See application file for complete search history.

(56) References Cited

U.S. PATENT DOCUMENTS

| | | | | |
|---|---|---|---|---|
| 5,516,740 | A * | 5/1996 | Cody et al. | 502/204 |
| 5,545,674 | A * | 8/1996 | Behrmann et al. | 518/715 |
| 5,935,889 | A * | 8/1999 | Murrell et al. | 502/9 |
| 5,972,829 | A * | 10/1999 | Ichimura | 502/303 |
| 6,126,814 | A * | 10/2000 | Lapinski et al. | 208/217 |
| 6,162,350 | A * | 12/2000 | Soled et al. | 208/113 |
| 6,177,381 | B1 * | 1/2001 | Jensen et al. | 502/325 |
| 6,620,313 | B1 * | 9/2003 | Demmin et al. | 208/112 |
| 6,673,237 | B2 * | 1/2004 | Liu et al. | 208/213 |
| 6,710,003 | B2 * | 3/2004 | Jan et al. | 502/60 |
| 6,758,963 | B1 * | 7/2004 | Hantzer et al. | 208/213 |
| 6,783,663 | B1 * | 8/2004 | Riley et al. | 208/213 |
| 6,863,803 | B1 * | 3/2005 | Riley et al. | 208/213 |
| 6,929,738 | B1 * | 8/2005 | Riley et al. | 208/210 |
| 7,087,191 | B2 * | 8/2006 | Van Hardeveld et al. | 252/373 |
| 7,176,159 | B1 * | 2/2007 | Wheelock et al. | 502/303 |
| 7,455,817 | B2 * | 11/2008 | Krause et al. | 422/191 |
| 2008/0064912 | A1 * | 3/2008 | Jacobsen et al. | 585/899 |

\* cited by examiner

*Primary Examiner*—Cam N Nguyen
(74) *Attorney, Agent, or Firm*—James C Paschall

(57) ABSTRACT

A process and catalyst for the selective hydrodesulfurization of a naphtha containing olefins. The process produces a naphtha stream having a reduced concentration of sulfur while maintaining the maximum concentration of olefins.

16 Claims, 1 Drawing Sheet

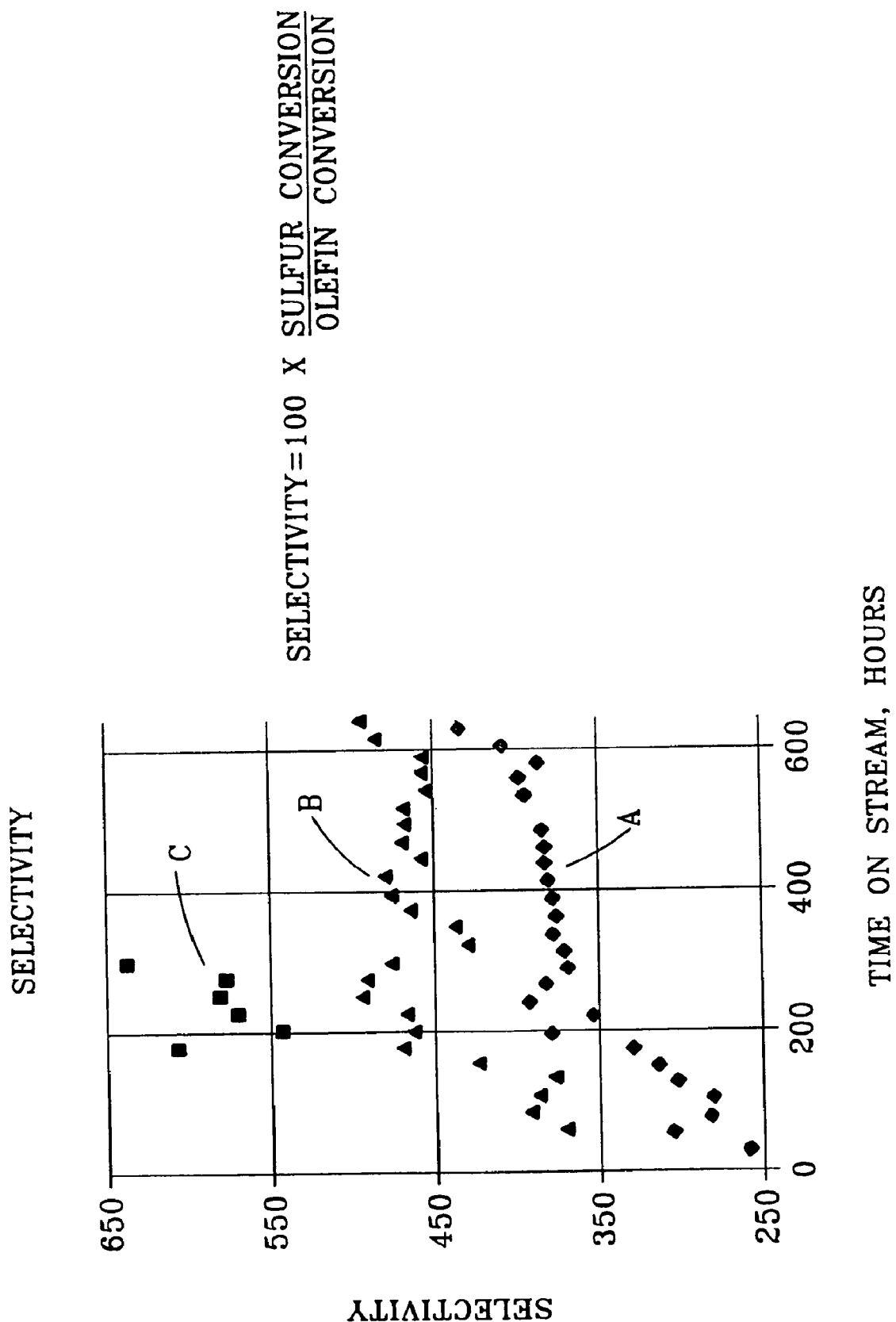

SELECTIVE NAPHTHA DESULFURIZATION PROCESS AND CATALYST

CROSS-REFERENCE TO RELATED APPLICATION

This application is a Division of copending application Ser. No. 10/875,117 filed Jun. 23, 2004, the contents of which are hereby incorporated by reference in its entirety.

FIELD OF THE INVENTION

The field of art to which this invention pertains is the selective hydrodesulfurization of a naphtha containing olefins. The desired product is a naphtha stream having a reduced concentration of sulfur while maintaining the maximum concentration of olefins.

BACKGROUND OF THE INVENTION

Naphtha streams are one of the primary products in the refining of crude oil. These streams are blended to provide a gasoline pool which is marketed as motor fuel. Naphtha streams particularly those streams which are products of a thermal or catalytic cracking process such as coking or fluidized catalytic cracking contain undesirable high levels of sulfur and desirable olefin compounds. The valuable olefins contribute to the desirable characteristic of a high octane fuel in the resulting gasoline pool and thus it is desirable not to saturate the high octane olefins to lower octane paraffins during hydrodesulfurization. There is a continuing need for catalysts having improved properties for the desulfurization of naphtha streams in order that the sulfur concentration of the cracked naphtha can be reduced. The prior art has taught hydrodesulfurization catalysts and processes for desulfurizing naphtha feed streams while striving to minimize the saturation of the olefin compounds. While there are commercially successful hydrodesulfurization catalysts in use today, there is a continuing need for improved catalysts that are capable of combining a high level of desulfurization with a minimum of olefin saturation.

INFORMATION DISCLOSURE

U.S. Pat. No. 6,126,814 (Lapinski et al.) discloses a process for hydrodesulfurizing a naphtha feedstream using a catalyst comprising molybdenum and cobalt and having an average median pore diameter from about 60 Å to 200 Å, a cobalt to molybdenum atomic ratio of about 0.1 to about 1, a molybdenum oxide surface concentration of about $0.5 \times 10^{-4}$ to about $3 \times 10^{-4}$ g molybdenum oxide/m$^2$ and an average particle size of less than 2 mm in diameter.

U.S. Pat. No. 6,177,381 (Jensen et al.) discloses a layered catalyst composition comprising an inner core such as alpha alumina and an outer layer bonded to the inner core composed of an outer refractory inorganic oxide such as gamma alumina. The outer layer has uniformly dispersed thereon a platinum group metal such as platinum and a promoter metal such as tin. The composition also contains a modifier metal such as lithium. The catalyst shows improved durability and selectivity for dehydrogenating hydrocarbons. The patent also discloses that this catalyst is useful for the hydrogenation of hydrocarbons.

U.S. Pat. No. 6,673,237 (Liu et al.) discloses a process for the selective desulfurization of naphtha feed streams utilizing a monolithic honeycomb catalyst bed.

U.S. Pat. No. 4,716,143 (Imai et al.) discloses a surface impregnated catalytic composite comprising a platinum group metal component.

BRIEF SUMMARY OF THE INVENTION

The present invention is a selective naphtha desulfurization process utilizing a hydrodesulfurization catalyst having the desulfurization metal dispersed in a thin outer layer of the catalyst. In one embodiment of the present invention, the hydrodesulfurization catalyst is a layered composition comprising an inner core and an outer layer comprising an inorganic oxide bonded to the inner core wherein the outer layer contains a desulfurization metal dispersed in the outer layer. In an another embodiment of the present invention, the hydrodesulfurization catalyst is surface impregnated with a desulfurization metal such that the average concentration of the surface impregnated desulfurization metal on the surface layer having a thickness of from about 40 to about 400 microns is at least two times the concentration of the respective desulfurization metal in the center core of the support.

BRIEF DESCRIPTION OF THE DRAWING

The FIGURE shows a plot of the hydrodesulfurization selectivity of the present invention compared with the prior art.

DETAILED DESCRIPTION OF THE INVENTION

Naphtha feedstocks suitable for use in the present invention can comprise any one or more refinery stream boiling in the range from about 38° C. (100° F.) to about 232° C. (450° F.) at atmospheric pressure. The naphtha feedstock generally contains cracked naphtha which usually comprises fluid catalytic cracking unit naphtha (FCC naphtha), coker naphtha, hydrocracker naphtha and gasoline blending components from other sources wherein a naphtha boiling range stream can be produced. FCC naphtha and coker naphtha are generally more olefinic naphthas since they are products of catalytic and thermal cracking reactions, and are more preferred feedstocks for use in the present invention.

The naphtha feedstock, preferably a cracked naphtha, generally contains not only paraffin, naphthenes, and aromatics, but also unsaturates, such as open-chain and cyclic olefins, dienes and cyclic hydrocarbons with olefinic side chains. The cracked naphtha feedstocks generally contain an overall olefins concentration ranging as high as about 60 weight percent. The cracked naphtha feedstock can comprise a diene concentration of as much as 15 weight percent. High diene concentrations can result in a gasoline product with poor stability and color. The cracked naphtha feedstock sulfur content will generally range from about 0.05 to about 0.7 weight percent based on the weight of the feedstock. Nitrogen content will generally range from about 5 wppm to about 500 wppm.

There are many hydrodesulfurization catalysts in the prior art but along with their ability to desulfurize naphtha boiling range hydrocarbons they successfully hydrogenate the olefins which may be present. For environmental reasons, the naphtha must be desulfurized but the olefins contribute to a high octane rating and therefore it is highly desirable to retain the highest olefin concentration possible in the desulfurized naphtha. Many of the approaches to naphtha desulfurization have focused on modifying traditional hydrotreating processes using less severe operating conditions and catalysts that selectively remove sulfur but leave the bulk of the olefins unreacted.

It has unexpectedly been discovered that hydrotreating catalysts in which the metal loading is restricted to the outer layer of the catalysts are more selective for hydrodesulfurization compared to olefin saturation than catalysts in which the metal is uniformly distributed. In accordance with the present invention, the catalysts preferably contain desulfurization metals selected from the group consisting of cobalt, nickel, molybdenum and tungsten.

The catalyst support material utilized in one embodiment of the present invention is a layered composition comprising an inner core composed of a material which has substantially lower adsorptive capacity for catalytic metal precursors, relative to the outer layer. Some of the inner core materials are also not substantially penetrated by liquid hydrocarbons. Examples of the inner core material include, but are not limited to, refractory inorganic oxides, silicon carbide and metals. Examples of refractory inorganic oxides include without limitation alpha alumina, theta alumina, cordierite, zirconia, titania and mixtures thereof. A preferred inorganic oxide is alpha alumina.

The materials which form the inner core can be formed into a variety of shapes such as pellets, extrudates, spheres or irregularly shaped particles although not all materials can be formed into each shape. Preparation of the inner core can be done by means known in the art such as oil dropping, pressure molding, metal forming, pelletizing, granulation, extrusion, rolling methods and marumerizing. A spherical inner core is preferred. The inner core whether spherical or not preferably has an effective diameter of about 0.05 mm to about 5 mm and more preferably from about 0.8 mm to about 3 mm. For a non-spherical inner core, effective diameter is defined as the diameter the shaped article would have if it were molded into a sphere. Once the inner core is prepared, it is calcined at a temperature of about 400° C. to about 1500° C.

The inner core is next coated with a layer of a refractory inorganic oxide which is different from the inorganic oxide which may be used as the inner core and will be referred to as the outer refractory inorganic oxide. This outer refractory oxide is one which has good porosity, has a surface area of at least 20 $m^2/g$, and preferably at least 50 $m^2/g$, an apparent bulk density of about 0.2 g/ml to about 1.5 g/ml and is chosen from the group consisting of gamma alumina, delta alumina, eta alumina, theta alumina, silica/alumina, zeolites, non-zeolitic molecular sieves (NZMS), titania, zirconia and mixtures thereof. It should be pointed out that silica/alumina is not a physical mixture of silica and alumina but means an acidic and an amorphous material that has been cogelled or coprecipitated. This term is well known in the art, see e.g., U.S. Pat. Nos. 3,909,450; 3,274,124 and 4,988,659. Examples of zeolites include, but are not limited to, zeolite Y, zeolite X, zeolite L, zeolite beta, ferrierite, MFI, mordenite and erionite. Non-zeolitic molecular sieves (NZMS) are those molecular sieves which contain elements other than aluminum and silicon and include silicoaluminophosphates (SAPOs) described in U.S. Pat. No. 4,440,871, ELAPSOs described in U.S. Pat. No. 4,793,984, MeAPOs described in U.S. Pat. No. 4,567,029 all of which are incorporated by reference. Preferred refractory inorganic oxides for the outer layer are gamma and eta alumina.

A way of preparing a gamma alumina is by the well-known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent, e.g., hexamethylenetetraamine, and dropping the resultant mixture into an oil bath maintained at elevated temperatures (about 93° C.). The droplets of the mixture remain in the oil bath until they set and form hydrogel spheres. The spheres are then continuously withdrawn from the oil bath and typically subjected to specific aging and drying treatments in oil and ammoniacal solutions to further improve their physical characteristics. The resulting aged and gelled spheres are then washed and dried at a relatively low temperature of about 80° C. to 260° C. and then calcined at a temperature of about 455° C. to 705° C. for a period of about 1 to about 20 hours. This treatment effects conversion of the hydrogel to the corresponding crystalline gamma alumina.

The outer layer is applied by forming a slurry of the outer refractory oxide and then coating the inner core with the slurry by means well known in the art. Slurries of inorganic oxides can be prepared by means well known in the art which usually involve the use of a peptizing agent. For example, any of the transitional aluminas can be mixed with water and an acid such as nitric, hydrochloric, or sulfuric to give a slurry. Alternatively, an aluminum sol can be made by for example, dissolving aluminum metal in hydrochloric acid and then mixing the aluminum sol with the alumina powder.

It is preferred that the slurry contain an organic bonding agent which aids in the adhesion of the layer material to the inner core. Examples of this organic bonding agent include but are not limited to polyvinyl alcohol (PVA), hydroxyl propyl cellulose, methyl cellulose and carboxy methyl cellulose. The amount of organic bonding agent which is added to the slurry will vary considerably from about 0.1 weight percent to about 3 weight percent of the slurry. How strongly the outer layer is bonded to the inner core can be measured by the amount of layer material lost during an attrition test, i.e., attrition loss. Loss of the second refractory oxide by attrition is measured by agitating the catalyst, collecting the fines and calculating an attrition loss. It has been found that by using an organic bonding agent as described above, the attrition loss is less than about 10 weight percent of the outer layer. Finally, the thickness of the outer layer varies from about 40 to about 400 microns, preferably from about 40 microns to about 300 microns and more preferably from about 45 microns to about 200 microns.

Depending on the particle size of the outer refractory inorganic oxide, it may be necessary to mill the slurry in order to reduce the particle size and simultaneously give a narrower particle size distribution. This can be done by means known in the art such as ball milling for times of about 30 minutes to about 5 hours and preferably from about 1.5 to about 3 hours. It has been found that using a slurry with a narrow particle size distribution improves the bonding of the outer layer to the inner core.

The slurry may also contain an inorganic bonding agent selected from an alumina bonding agent, a silica bonding agent or mixtures thereof. Examples of silica bonding agents include silica sol and silica gel, while examples of alumina bonding agents include alumina sol, boehmite and aluminum nitrate. The inorganic bonding agents are converted to alumina or silica in the finished composition. The amount of inorganic bonding agent varies from about 2 to about 15 weight percent as the oxide, and based on the weight of the slurry.

Coating of the inner core with the slurry can be accomplished by means such as rolling, dipping, spraying, etc. One preferred technique involves using a fixed fluidized bed of inner core particles and spraying the slurry into the bed to coat the particles evenly. The thickness of the layer can vary considerably, but usually is from about 40 to about 400 microns preferably from about 40 to about 300 microns and most preferably from about 50 microns to about 200 microns. Once the inner core is coated with the layer of outer refractory inorganic oxide, the resultant layered support is dried at a temperature of about 100° C. to about 320° C. for a time of about 1 to about 24 hours and then calcined at a temperature of about 400° C. to about 900° C. for a time of about 0.5 to about 10 hours to effectively bond the outer layer to the inner core and provide a layered catalyst support. Of course, the drying and calcining steps can be combined into one step.

When the inner core is composed of a refractory inorganic oxide (inner refractory oxide), it is necessary that the outer refractory inorganic oxide be different from the inner refractory oxide. Additionally, it is required that the inner refractory inorganic oxide have a substantially lower adsorptive capacity for catalytic metal precursors relative to the outer refractory inorganic oxide.

Having obtained the layered catalyst support, catalytic metals can be dispersed on the layered support by means known in the art. These catalytic metal components can be deposited on the layered support in any suitable manner known in the art. One method involves impregnating the layered support with a solution (preferably aqueous) of a decomposable compound of the metal or metals. By decomposable is meant that upon heating the metal compound is converted to the metal or metal oxide with the release of byproducts. The metals of the catalyst of the present invention can be deposited or incorporated upon the support by any suitable conventional means, such as by impregnation employing heat-decomposable salts of the desired hydrogenation metals or other methods known to those skilled in the art such as ion-exchange, with impregnation methods being preferred.

Impregnation of the hydrogenation metals on the catalyst support can be performed using incipient wetness techniques. The catalyst support is precalcined and the amount of water to be added to just wet all of the support is determined. The aqueous impregnation solutions are added such that the aqueous solution contains the total amount of hydrogenation component metal or metals to be deposited on the given mass of support. Impregnation can be performed for each metal separately, including an intervening drying step between impregnation, or as a single co-impregnation step. The saturated support can then be separated, drained and dried in preparation for calcination which is generally performed at a temperature from about 260° C. (500° F.) to about 648° C. (1200° F.), or more preferably from about 426° C. (800° F.) to about 593° C. (1100° F.). The outer refractory inorganic oxide may be impregnated or otherwise associated with desulfurization metals before being deposited on the inner refractory oxide or core. In any event, the desulfurization metals are preferably present on the outer refractory inorganic oxide in an amount from about 2 to about 20 weight percent.

In accordance with another embodiment of the present invention, the catalytic composite comprises a catalytic desulfurization metal selected from the group consisting of cobalt, nickel, molybdenum and tungsten on a refractory inorganic oxide support wherein the desulfurization metal is surface impregnated such that the average concentration of the surface impregnated desulfurization metal on the surface layer having a thickness from about 40 to about 400 microns is at least about two times the concentration of the respective desulfurization metal in the center core of the support.

An essential feature of this embodiment of the present invention is that the desulfurization metal or metals are surface impregnated upon a catalytic support material and that substantially all of the desulfurization metal is located within at most a 400 micron exterior layer of the catalyst support. It is to be understood that the term "exterior" is defined as the outermost layer of the catalyst particle. By "layer" it is meant a stratum of substantially uniform thickness.

A desulfurization metal is considered to be surface impregnated when the average concentration of the metal or metals within a 40 to 400 micron exterior layer of the catalyst is at least about two times the average concentration of the same metal component in the center core of the catalyst. By "substantially all" it is meant that at least about 75% of the surface impregnated metal component(s) in question. The surface impregnated metal concentration then tapers off as the center of the support is approached. The actual gradient of the desulfurization metal(s) within the catalyst support varies depending upon the exact manufacturing method employed to fabricate the catalyst. Therefore, distribution of the desulfurization metal is best defined as being both surface impregnated and substantially all located within at most the 400 micron exterior layer of the support.

The support material preferably has a nominal diameter of 850 microns or more. For a catalyst support material having a diameter of 850 microns, the exterior layer wherein 75% of the surface impregnated components are located will approach 100 microns. The exterior layer wherein 75% of the surface-impregnated metal(s) are located will approach a maximum value of 400 microns as the diameter of the catalyst support increases beyond 2000 microns.

Although it is not understood completely and not wishing to be bound by any particular theory, it is believed that by restricting substantially all of the surface impregnated metal (s) to at most a 400 micron exterior layer of the catalyst support, more facile and selective access to these catalytic sites is achieved, allowing the hydrocarbon reactants and products shorter diffusion paths. By decreasing the length of the diffusion paths the reactants and products have a shorter and optimum residence time in the catalyst particle thereby successfully achieving the desulfurization reaction while simultaneously minimizing the saturation or hydrogenation of olefin components of the fresh feed. This results in an increase in selectivity to desired product of a desulfurized naphtha while maximizing the retention of the olefins.

The catalyst support for this embodiment of the present invention may be selected from the inorganic oxides disclosed and taught hereinabove as suitable for the outer refractory inorganic oxide in another embodiment of the present invention. Preferred refractory inorganic oxide support materials for the instant embodiment are gamma and eta alumina. In an embodiment desulfurization metal(s) may be incorporated into the catalytic composite of the invention by any means suitable to result in surface impregnation of the metal (s) wherein substantially all of the surface impregnated metal (s) is located within at most a 400 micron wide exterior layer of the catalyst support particle. The surface impregnation may be conducted by utilizing any known technique which achieves the necessary distribution of metals as described herein. One method for the surface impregnation of metals on a desulfurization catalyst is to adjust the pH of the impregnation solution to control the location of the metal components. Another method for the surface impregnation is to restrict the total volume of the impregnation solution in order to restrict the penetration of solution and thereby metals into the support particle. After the desulfurization metal components have been surface impregnated on the catalyst support, the resulting catalyst composite will generally be dried at a temperature from about 100° C. to about 150° C. and then calcined at a temperature from about 300° C. to about 650° C. The finished surface impregnated catalyst preferably contains desulfurization metals in an amount from about 2 to about 20 weight percent.

Hydrodesulfurization conditions preferably include a temperature from about 240° C. (400° F.) to about 399° C. (750° F.) and a pressure from about 790 kPa (100 psig) to about 4 MPa (500 psig). The hydrodesulfurization process using the catalysts of the present invention typically begins with a cracked naphtha feedstock preheating step. The charge stock is preferably preheated in a feed/effluent heat exchanger prior to entering a fired furnace for final preheating to a targeted reaction zone inlet temperature. The feedstock can be contacted with a hydrogen-rich gaseous stream prior to, during or after preheating. The hydrogen-rich stream may also be added in the hydrodesulfurization reaction zone. The hydrogen stream can be pure hydrogen or can be in admixture with other components found in refinery hydrogen streams. It is preferred that the hydrogen stream have little, if any, hydrogen sulfide. The hydrogen stream purity is preferably at least about 65 volume percent hydrogen and more preferably at least 75 volume percent hydrogen for best results.

The hydrodesulfurization reaction zone can consist of one or more fixed bed reactors each of which can comprise a plurality of catalyst beds. Since some olefin saturation will take place and the olefin saturation and the desulfurization reaction are generally exothermic, consequently interstage cooling between fixed bed reactors or between catalyst beds in the same reactor shell can be employed. A portion of the heat generated from the hydrodesulfurization process can be recovered and where this option is not available, cooling may be achieved with heat-exchange with the hydrogen quench stream, air or cooling water.

EXAMPLE

A catalyst was prepared by extruding a comulled dough containing cobalt, molybdenum and alumina to form 3.17 mm (⅛″) tri-lobe extrudate particles containing 1 weight percent cobalt and 3.4 weight percent molybdenum. The metals were uniformly dispersed throughout each catalyst particle. This resulting catalyst is identified as Catalyst A and is not a catalyst of the present invention.

A portion of Catalyst A was crushed to produce catalyst particles ranging in nominal diameter from 1.41 mm (0.0937 inches) to 2.38 mm (0.937 inches) which catalyst is identified as Catalyst B and also is not a catalyst of the present invention.

A batch of spherical support material containing a low surface area core of cordierite with a surface layer coating of alumina with a thickness of 100 microns (0.1 mm) was prepared and had a nominal diameter of 2000 microns (0.08 inches). This resulting spherical support material was impregnated to produce a catalyst having an alumina metals loading of 1 weight percent cobalt and 3.4 weight percent molybdenum. This resulting catalyst is identified as Catalyst C and is a catalyst of one embodiment of the present invention.

An olefin containing naphtha feedstock was selected to test the hereinabove described catalysts and contained a 50/50 volumetric blend of intermediate cracked naphtha and heavy cracked naphtha which blend contained about 2200 wppm sulfur and about 24 weight percent olefins.

Each of the test catalysts was presulfided in an identical manner and tested in a hydrodesulfurization reaction zone with the above described naphtha feedstock at conditions including a pressure of 1800 kPa (250 psig), a liquid hourly space velocity (LHSV) of about 3 and a temperature of about 274° C. (525° F.). After a line out period, Catalyst A produced a product naphtha containing a sulfur concentration of about 250 wppm but the olefin concentration was reduced from 24 weight percent olefins to 18.5 weight percent olefins. Catalyst B produced a product naphtha containing a sulfur concentration of about 250 wppm while the olefin concentration was reduced from 24 weight percent to 19.5 weight percent. At the initial test conditions including an inlet temperature of about 274° C. (525° F.), Catalyst C produced a product naphtha containing about 600 wppm sulfur but having essentially no reduction in olefin concentration. During the test for Catalyst C, the reactor inlet temperature was then increased from about 274° C. (525° F.) to about 296° C. (565° F.) and the product sulfur concentration was reduced to about 250 wppm while the olefin concentration was only reduced from 24 weight percent to 20.1 weight percent.

Although the inlet temperature for Catalyst C was higher than for Catalyst A and Catalyst B to achieve similar product sulfur concentrations, the highly sought characteristic of high olefin retention was observed. In order to demonstrate the olefin retention characteristics, a series of selectivities were calculated for each catalyst. The selectivity was defined as the sulfur conversion divided by the olefin conversion and multiplied by 100 for convenience. The sulfur conversion is further defined as the feed sulfur minus product sulfur divided by the feed sulfur. The olefin conversion is also further defined as feed olefin minus product olefin divided by the feed olefin. The resulting calculated selectivities for the three tested catalysts are plotted in the FIGURE as selectivity versus time on stream in hours. From the FIGURE, it is apparent that with a constant desulfurization level, the olefin retention of Catalyst A is the lowest of the three catalyst tested. Catalyst B will be noted to have a higher olefin retention in the product than Catalyst A. The FIGURE also shows that Catalyst C, the catalyst of the present invention, possesses the highest olefin retention in the product of the three catalysts tested. Therefore, the present invention successfully achieves the desulfurization of naphtha containing olefins while preserving a greater concentration of olefins in the desulfurized product naphtha.

The foregoing description, example and FIGURE clearly illustrate the advantages encompassed by the present invention and the benefits to be afforded with the use thereof.

The invention claimed is:

1. A process for hydrodesulfurizing a naphtha feedstream containing olefins without excessive olefin saturation which process comprises:
   a) reacting an olefin containing naphtha feedstream in a hydrodesulfurization zone containing a hydrodesulfurization catalyst which catalyst is a layered catalyst composition comprising an inner core and an outer layer comprising an inorganic oxide bonded to the inner core wherein the outer layer has at least one desulfurization metal selected from the group consisting of cobalt, nickel, molybdenum and tungsten uniformly dispersed thereon; and
   b) recovering a naphtha stream having a reduced sulfur concentration.

2. The process of claim 1 wherein the inner core is selected from the group consisting of alpha alumina, theta alumina, silicon carbide, metals, cordierite, zirconia, titania and mixtures thereof.

3. The process of claim 1 wherein the outer layer comprising an inorganic oxide is selected from the group consisting of gamma alumina, delta alumina, theta alumina, silica-alumina, zeolites, non-zeolitic molecular sieves, titania and mixtures thereof.

4. The process of claim 1 wherein the outer layer has a thickness from about 40 to about 400 micrometers.

5. The process of claim 1 wherein the hydrodesulfurization zone is operated at conditions including a temperature from about 204° C. (400° F.) to about 399° C. (750° F.) and a pressure from about 790 kPa (100 psig) to about 3950 kPa (500 psig).

6. The process of claim 1 wherein the naphtha feedstream boils in the range from about 38° C. (100° F.) to about 232° C. (450° F.).

7. The process of claim 1 wherein the inner core has a lower adsorptive capacity for catalytic metal precursors relative to the outer layer comprising an inorganic oxide.

8. A process for hydrodesulfurizing naphtha feedstream containing olefins without excessive olefin saturation which process comprises:
  a) reacting an olefin containing naphtha feedstream boiling in the range from about 38° C. (100° F.) to about 232° C. (450° F.) in a hydrodesulfurization zone containing a hydrodesulfurization catalyst having a layered catalyst composition comprising an inner core and an outer layer comprising an inorganic oxide bonded to the inner core wherein the outer layer has a thickness from about 40 to about 400 micrometers and comprises cobalt and molybdenum uniformly dispersed thereon; and
  b) recovering a naphtha stream having a reduced sulfur concentration.

9. The process of claim 8 wherein the inner core has a lower adsorptive capacity for catalytic metal precursors relative to the outer layer comprising an inorganic oxide.

10. The process of claim 8 wherein the inner core is selected from the group consisting of alpha alumina, theta alumina, silicon carbide, metals, cordierite, zirconia, titania and mixtures thereof.

11. The process of claim 8 wherein the outer layer comprising an inorganic oxide is selected from the group consisting of gamma alumina, delta alumina, theta alumina, silica-alumina, zeolites, non-zeolitic molecular sieves, titania and mixtures thereof.

12. The process of claim 8 wherein the hydrodesulfurization zone is operated at conditions including a temperature from about 204° C. (400° F.) to about 399° C. (750° F.) and a pressure from about 790 kPa (100 psig) to about 3950 kPa (500 psig).

13. A process for desulfurizing a naphtha feedstream containing olefins without excessive olefin saturation which process comprises:
  a) reacting an olefin containing naphtha feedstream in a hydrodesulfurization zone containing a hydrodesulfurization catalyst comprising a catalytic desulfurization metal selected from the group consisting of cobalt, nickel, molybdenum and tungsten on a refractory inorganic oxide support wherein the desulfurization metal is surface impregnated such that the average concentration of the surface impregnated desulfurization metal on the surface layer having a thickness from about 40 to about 400 microns is at least about two times the concentration of the respective desulfurization metal in the center core of the support; and
  b) recovering a naphtha stream having a reduced sulfur concentration.

14. The process of claim 13 wherein the refractory inorganic oxide support comprises gamma alumina, delta alumina, theta alumina, silica-alumina, zeolites, non-zeolitic molecular sieves, titania and mixtures thereof.

15. The process of claim 13 wherein the hydrodesulfurization zone is operated at conditions including a temperature from about 204° C. (400° F.) to about 399° C. (750° F.) and a pressure from about 790 kPa (100 psig) to about 3950 kPa (500 psig).

16. The process of claim 13 wherein the naphtha feedstream boils in the range from about 38° C. (100° F.) to about 232° C. (450° F.).

* * * * *